(12) United States Patent
Kim et al.

(10) Patent No.: US 9,265,095 B2
(45) Date of Patent: Feb. 16, 2016

(54) METAL SECTOR HAVING CURVED INNER SURFACE AND COLD CRUCIBLE INDUCTION MELTER HAVING THE SAME

(75) Inventors: Cheon Woo Kim, Daejeon (KR); Deuk Man Kim, Daejeon (KR); Seok Mo Choi, Daejeon (KR); Hyun Jun Jo, Daejeon (KR); Hyun Je Cho, Daejeon (KR); Seung Chul Park, Daejeon (KR); Tae Won Hwang, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 78 days.

(21) Appl. No.: 13/883,645

(22) PCT Filed: Sep. 26, 2011

(86) PCT No.: PCT/KR2011/007052
§ 371 (c)(1),
(2), (4) Date: May 6, 2013

(87) PCT Pub. No.: WO2013/047913
PCT Pub. Date: Apr. 4, 2013

(65) Prior Publication Data
US 2013/0223471 A1 Aug. 29, 2013

(51) Int. Cl.
*H05B 6/22* (2006.01)
*H05B 6/28* (2006.01)
*F27B 14/06* (2006.01)
(Continued)

(52) U.S. Cl.
CPC ............... *H05B 6/28* (2013.01); *F27B 14/061* (2013.01); *F27B 14/08* (2013.01); *F27D 11/06* (2013.01); *F27D 2099/0015* (2013.01); *Y02P 10/253* (2015.11)

(58) Field of Classification Search
CPC .............. H05B 6/16; H05B 6/22; H05B 6/24; H05B 6/28; H05B 6/42; H05B 6/367; H05B 6/26; F27B 14/10; F27B 14/063; F27B 14/061; F27B 2014/0862; F27B 14/08; C22B 34/00; C22B 34/1295; C22B 34/14; C22B 34/24; C22B 34/32; C22B 34/34; C22B 4/00; F27D 1/12
USPC ......... 373/151, 154, 155, 156, 158, 138, 140, 373/153, 157, 71, 72, 75, 76, 165; 75/10.14, 10.18
See application file for complete search history.

(56) References Cited

U.S. PATENT DOCUMENTS 3,709,678 A * 1/1973 Helary et al. ................. 373/158
4,049,384 A * 9/1977 Wenckus et al. ............... 373/27
(Continued)

FOREIGN PATENT DOCUMENTS

JP 05-264176 A 10/1993
JP 06-273058 A 9/1994
(Continued)

*Primary Examiner* — Hung D Nguyen
(74) *Attorney, Agent, or Firm* — Rabin & Berdo, P.C.

(57) ABSTRACT

A cold crucible induction melter includes a wall formed of a plurality of metal sectors insulated by an insulator. Each metal sector includes an inner curved portion which forms an inner surface of the wall and is convex inward relative to the wall, an outer planar portion which forms an outer surface of the wall, and two side planar portions which connect the inner curved portion to the outer planar portion. The metal sector further includes a cooling passage longitudinally formed inside the metal sector, and an insulation layer covering the inner curved portion and the two side planar portions.

3 Claims, 5 Drawing Sheets

(51) Int. Cl.
  *F27B 14/08* (2006.01)
  *F27D 11/06* (2006.01)
  *F27D 99/00* (2010.01)

(56) References Cited

U.S. PATENT DOCUMENTS

| | | | |
|---|---|---|---|
| 4,738,713 | A | 4/1988 | Stickle et al. |
| 4,923,508 | A | 5/1990 | Diehm et al. |
| 5,283,805 | A * | 2/1994 | Kawano et al. ............ 373/156 |
| 6,996,153 | B2 | 2/2006 | Brun et al. |
| 2005/0129087 | A1 | 6/2005 | Brun et al. |

FOREIGN PATENT DOCUMENTS

| | | |
|---|---|---|
| JP | 11-074070 A | 3/1999 |
| JP | 2002-277170 A | 9/2002 |
| JP | 2002-327988 A | 11/2002 |
| KR | 10-2004-0077935 A | 9/2004 |

* cited by examiner

METAL SECTOR HAVING CURVED INNER SURFACE AND COLD CRUCIBLE INDUCTION MELTER HAVING THE SAME

TECHNICAL FIELD

The present invention relates, in general, to a metal sector having a curved inner surface and a cold crucible induction melter having the same and, more particularly, to a metal sector forming a wall of a melter which can prevent an electric arc from being generated and enhance the operational efficiency of the melter, and a cold crucible induction melter having the metal sector.

BACKGROUND ART

Generally, a cold crucible induction melter (CCIM) has a cylindrical melting chamber which comprises a plurality of metal sectors along which coolant circulates. The metal sectors are insulated by insulators interposed therebetween. A high-frequency induction coil is provided outside the melting chamber to provide power required to melt a substance contained in the melting chamber.

Representative examples of cold crucible induction melters in which metal sectors form a wall of a melter and electrical insulators are interposed between the metal sectors were proposed in U.S. Pat. No. 4,923,508 (Date of patent: May 8, 1990), No. 4,738,713 (Date of patent: Apr. 19, 1988), and No. 6,996,153 (Date of patent: Feb. 7, 2006).

In such a cold crucible induction melter, high-frequency current is applied to an induction coil to melt a substance in the melter. The wall of the melter includes a plurality of metal sectors which are insulated by the insulators to restrict induced current and ensure relative penetrability of an electromagnetic field.

Furthermore, each metal sector is cooled by circulation of coolant to maintain the wall of the melter at a predetermined temperature. During a vitrification process of waste, molten glass which makes contact with the wall of the melter is solidified, thus forming a thin layer so that the sealing performance of the melter is ensured.

As such, the metal sector is made of metal which has electromagnetic field penetrability, but metal causes generation of heat from induction current, resulting in a reduction of operational efficiency of the melter.

To avoid these problems, the metal sector must restrict induced current and prevent an electric arc from being generated between the metal sectors.

Given this, the shape of the metal sector is designed such that the size thereof is as small as possible to minimize generation of induced current, or to prevent an electric arc from being generated. Typically, the cross-sectional shape of the metal sector is rhomboidal or trapezoidal, and corners of the metal sector are rounded.

DISCLOSURE

Technical Problem

Accordingly, the present invention has been made keeping in mind the above problems occurring in the prior art, and an object of the present invention is to provide a metal sector which has a curved inner surface and is able to prevent an electric arc from being generated and enhance the operational efficiency of the melter, and a cold crucible induction melter having the metal sector.

Technical Solution

In order to accomplish the above object, the present invention provides a cold crucible induction melter, including a wall formed of a plurality of metal sectors insulated by an insulator, wherein each of the metal sectors comprises: an inner curved portion forming an inner surface of the wall, the inner curved portion being convex inward relative to the wall; an outer planar portion forming an outer surface of the wall; and a side planar portion connecting the inner curved portion to the outer planar portion.

In the cold crucible induction melter having the above-mentioned characteristics, a cooling passage may be longitudinally formed in each of the metal sectors, wherein the cooling passages of the adjacent metal sectors making a pair may be connected to each other.

Alternatively, a cooling passage may be longitudinally formed in each of the metal sectors, and the cooling passage may include a cooling tube provided outside the wall and connected to the cooling passage.

The number of cooling tubes may be equal to the number of metal sectors, wherein each of the cooling tubes may be connected to the cooling passage of the corresponding single sector.

Advantageous Effects

In a metal sector and a cold crucible induction melter having the metal sectors according to the present invention, each metal sector includes an inner curved portion which forms the inner surface of a wall of the melter and is convex inward relative to the wall, and an outer planar portion and side planar portions which are connected to the inner curved portion and respectively form the outer surface and side surfaces of the wall. The metal sector can prevent an electric arc from being generated. Furthermore, only a single cooling passage along which coolant for cooling the sector circulates is formed in each metal sector. Thereby, the size of the metal sector can be minimized, thus enhancing the operational efficiency of the melter.

Figure 1:
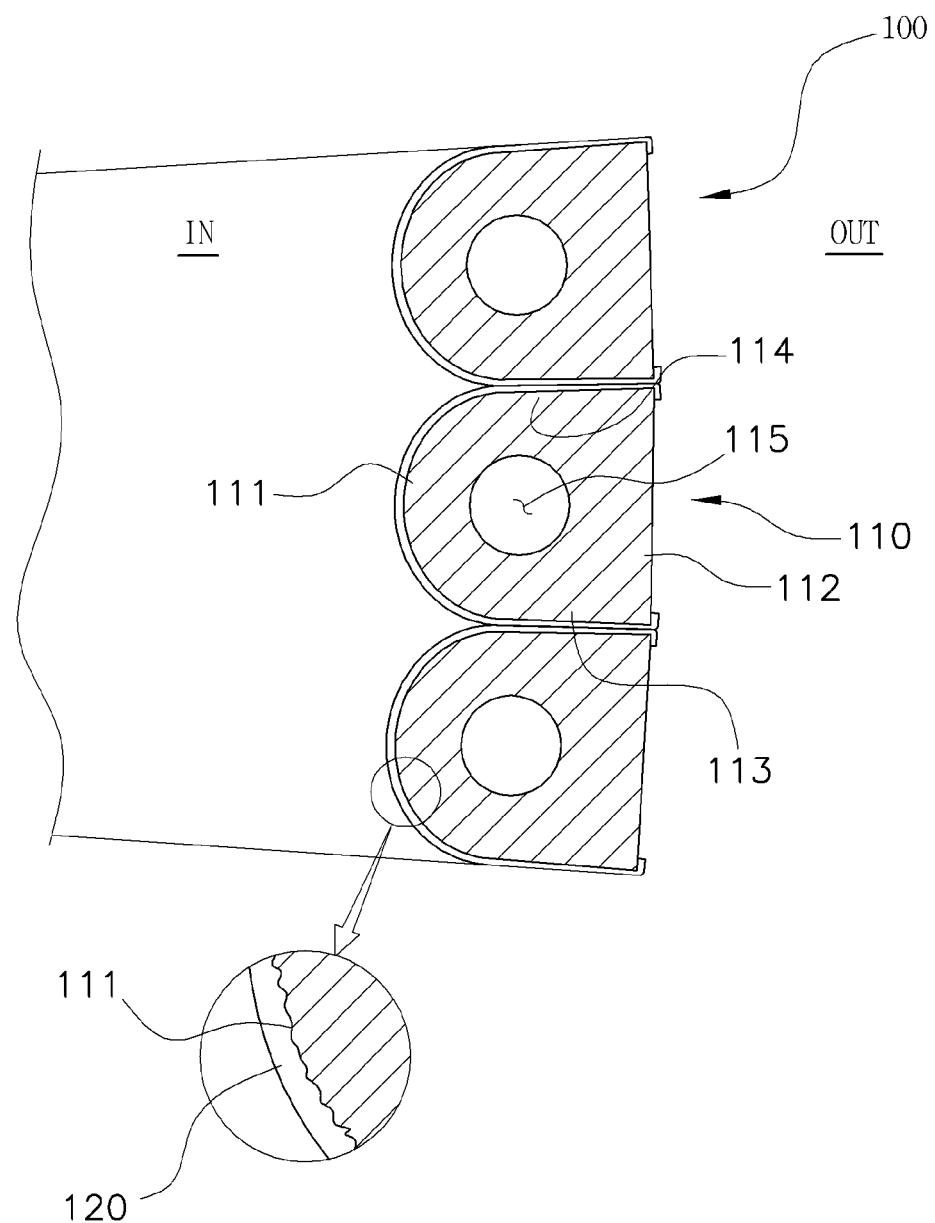
FIG. 1 is a sectional view showing the construction of a cold crucible induction melter according to the present invention.

<Description of the Reference Numerals in the Drawings>

| | |
|---|---|
| 100: wall | 110: sector |
| 111: inner curved portion | 112: outer planar portion |
| 113, 114: side planar portion | 120: insulation layer |

BEST MODE

Hereinafter, preferred embodiments of the present invention will be described in detail with reference to the attached drawings.

Metal sectors according to the present invention form a wall of a cold crucible induction melter (hereinafter referred to as a "melter"). Each metal sector includes an inner curved portion 111 which is convex inward relative to the wall 100 and forms an inner surface of the wall 100, an outer planar portion 112 which forms an outer surface of the wall 100, and side planar portions 113 and 114 which connect the inner curved portion 111 and the outer planar portion 112 to each other.

In the present invention, the metal sector generally has a bar shape. A cooling passage is longitudinally formed in the metal sector so that coolant circulates along the cooling passage and cools the wall of the melter.

FIG. 1 is a sectional view showing the construction of the cold crucible induction melter according to the present invention. This drawing illustrates only a portion of the melter. The melter is formed of metal sectors that have the same structure and are disposed in a predetermined arrangement such that the melter is generally cylindrical.

In detail, refer to FIG. 1, each sector 110 includes an inner curved portion 111 which is convex inward relative to the wall 100 and forms an inner surface of the wall 100, an outer planar portion 112 which forms an outer surface of the wall 100, and side planar portions 113 and 114 which connect the inner curved portion 111 and the outer planar portion 112 to each other.

At least one cooling passage 115 is longitudinally formed in each sector 110, and coolant circulates along the cooling passage 115 to cool the wall of the melter.

Corners where the outer planar portion 112 meets the side planar portions 113 and 114 may be rounded or chamfered.

The material of each sector may be stainless steel. An insulator is provided between adjacent sectors so that the sectors are electrically insulated from each other. Preferably, the electrical insulation between the sectors can be realized by an insulation layer 120 which covers at least the inner curved portions 111 and the side planar portions 113 and 114 of the sectors.

Different kinds of materials can be used to fabricate the insulation layer 120, so long as they have excellent electrical insulating properties. Preferably, the insulation layer 120 may be made of alumina, zirconia, zirconium, etc. which has not only excellent electrical insulating properties but also superior abrasion and corrosion resistance so that it can be effectively used as an insulator. The insulation layer 120 functions to buffer heat as well as having the electrical insulation function. Meanwhile, a surface 111 of the portion of the sector to which the insulation layer 120 is applied is an uneven surface or has comparatively high roughness so that the coating ability of the insulation layer 120 can be enhanced.

Figure 2:
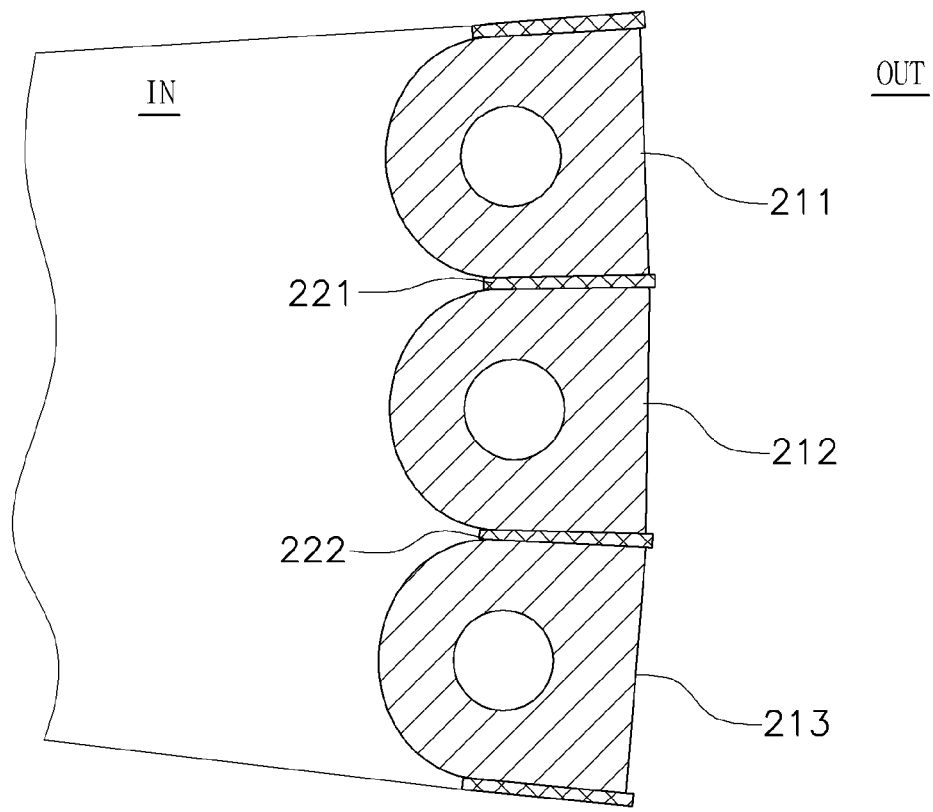
FIG. 2 is a view illustrating another embodiment of a cold crucible induction melter according to the present invention.

Referring to FIG. 2, each sector according to another embodiment of the present invention has the same shape as that of FIG. 1. However, unlike the sector of FIG. 1, insulation plates 221 and 222 which are made of a material such as mica are disposed between the sectors 211, 212 and 213 to electrically insulate the sectors 211, 212 and 213 from each other without a separate insulation layer being applied to the sectors 211, 212 and 213.

As stated above, a hollow space along which coolant circulates is longitudinally formed in each sector. Particularly, each metal sector according to the present invention is characterized in that only a single hollow space along which coolant circulates is formed in each metal sector.

The reason for this is because the sector can be sufficiently cooled just by using one hollow space, and the size of the metal sector can be reduced, compared to a metal sector having two or more hollow spaces along which coolant circulates.

Furthermore, unlike the conventional metal sector which requires two hollow spaces in each sector for inflow and discharge of coolant, the metal sector of the present invention can circulate coolant using only a single hollow space. Thus, when the sector is designed, it is easy to change the size of the cooling passage in response to a flow rate of coolant without changing the entire size of the sector. Therefore, the degree of freedom in design can be increased. In addition, absorption of induced currents in the wall of the melter can be minimized, and the operational efficiency of the melter can be enhanced.

Figure 3:
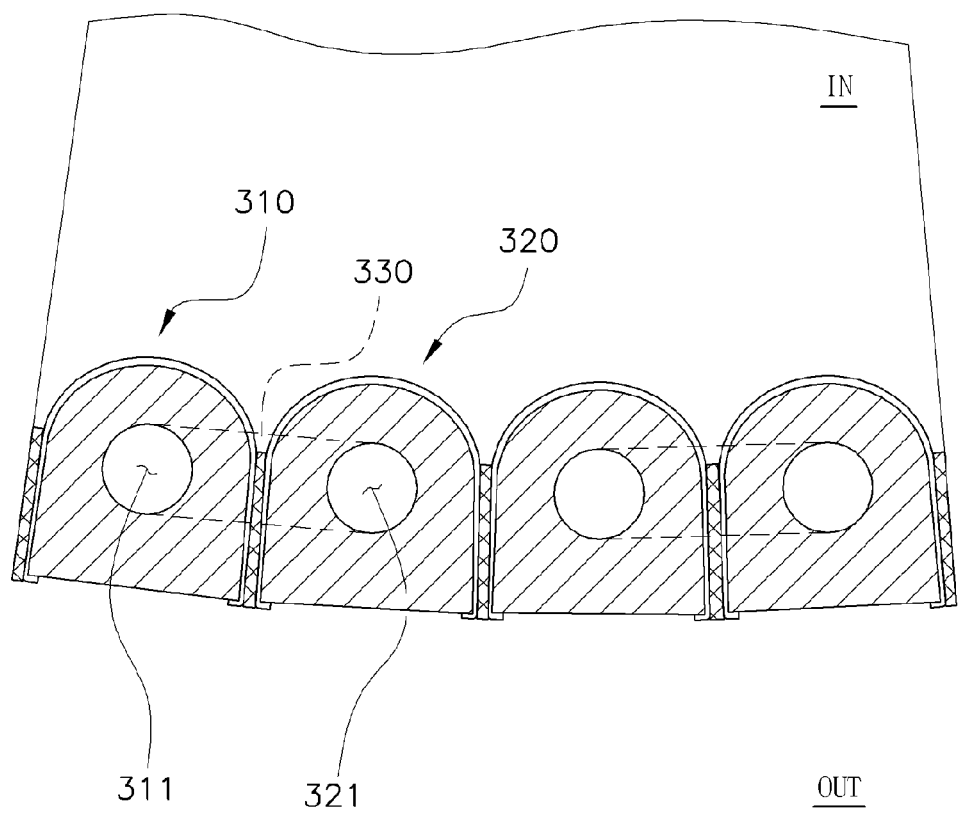
FIG. 3 is a view illustrating a further embodiment of a cold crucible induction melter according to the present invention.

Referring to FIG. 3, each metal sector according to a further embodiment includes the constructions of the embodiments of FIG. 1 or 2. However, unlike the embodiments of FIG. 1 or 2, the cooling passages of adjacent sectors 310 and 320 which make a pair are connected to each other so that coolant can circulate through the adjacent sectors 310 and 320.

In detail, the adjacent sectors 310 and 320 which make a pair respectively have a first cooling passage 311 and a second cooling passage 321. The first and second cooling passages 311 and 321 are connected to each other by a connection pipe 330 on the upper or lower ends of the sectors 310. Although it is not shown in the drawings, a coolant circulation device such as a circulation pump is connected to the first cooling passage and the second cooling passage so that coolant can circulate along the first and second cooling passages.

For example, coolant circulates through the sectors in such a way that coolant is drawn into the first cooling passage 311 by the circulation pump (not shown), is transferred to the second cooling passage 321 along the connection pipe 330, and then is returned from the second cooling passage 321 to the circulation pump. As such, the cooling operation is conducted in each pair of adjacent sectors.

The melter includes an even number of sectors such that a pair of sectors is the basic unit of the melter.

Figure 4:
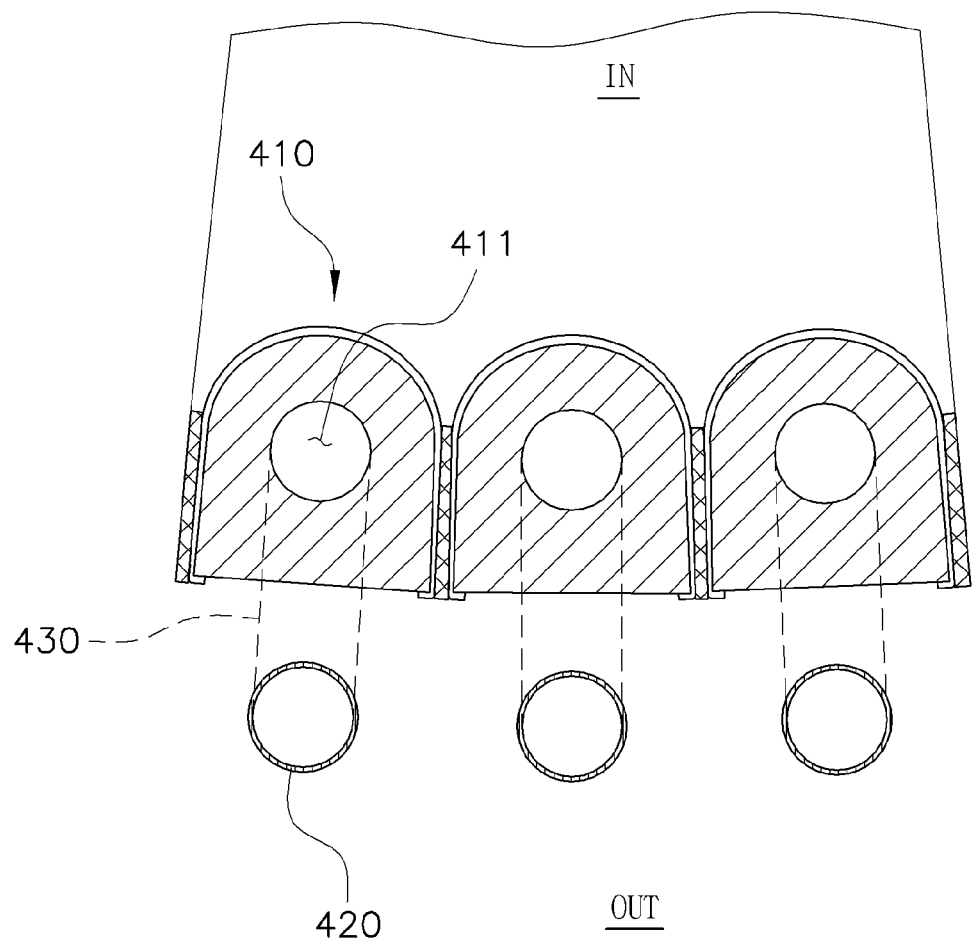
FIG. 4 is a view illustrating yet another embodiment of a cold crucible induction melter according to the present invention.

FIG. 4 is a view illustrating yet another embodiment of a cold crucible induction melter according to the present invention. Similarly, each metal sector of the melter of this embodiment has the same structure as that of the embodiments of FIGS. 1 and 2. However, in this embodiment, for circulation of coolant, each metal sector is connected to a cooling tube which is disposed outside the wall of the melter.

In detail, referring to FIG. 4, a cooling tube 420 is provided for each sector 410 at a position corresponding to the sector 410. A cooling passage 411 is connected to the cooling tube 420 by a connection pipe 430 on the upper or lower end of the sector.

The cooling passage 411 or the cooling tube 420 is connected to at least one common coolant header (not shown). The cooling passage and the cooling tube are connected to a coolant circulation device (not shown) for circulation of coolant.

Although, in FIG. 4, only a single cooling tube has been illustrated as being connected to each sector, two or more sectors may be connected to a single cooling tube so that coolant can circulate through the sectors.

Figure 5:
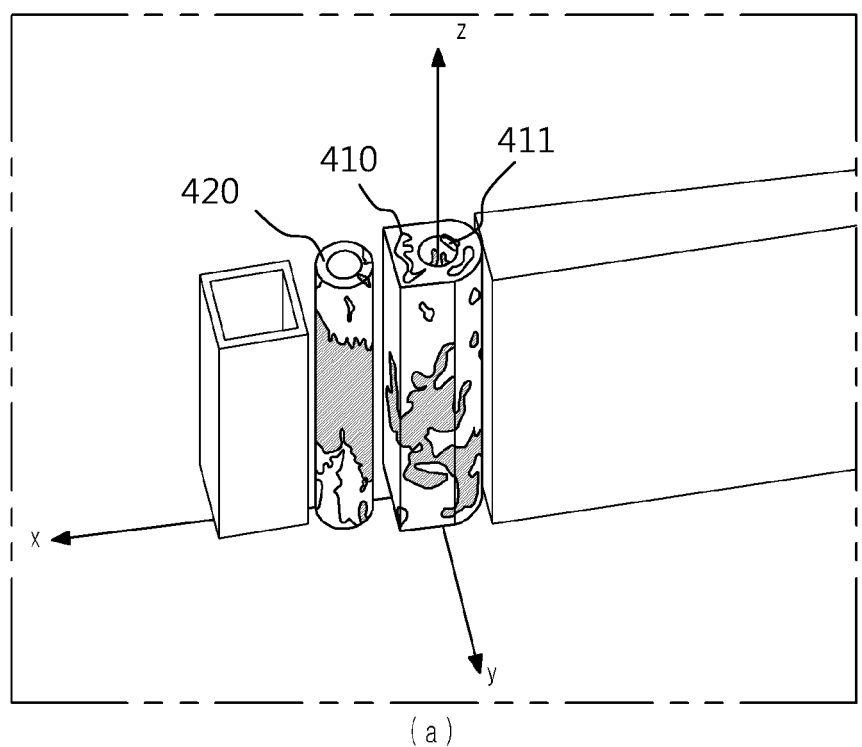
FIG. 5 shows views of models of electromagnetic analysis for metal sectors, wherein FIG. 5(*a*) shows a metal sector according to the present invention, and FIG. 5(*b*) shows a metal sector according to a conventional technique.
Figure 5:
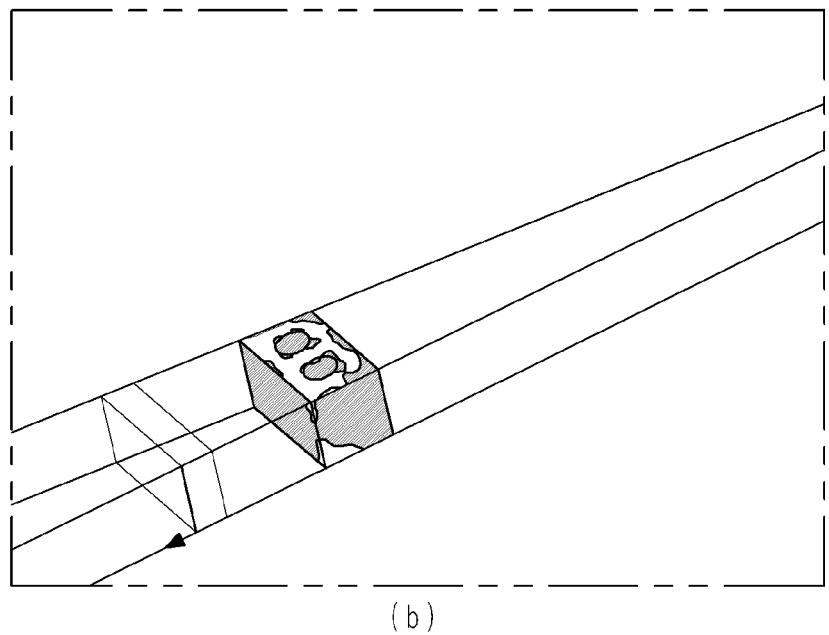

FIG. 5 shows views of models of electromagnetic analysis for metal sectors, wherein FIG. 5(a) shows the metal sector according to the present invention, and FIG. 5(b) shows the metal sector according to the conventional technique.

As shown in FIG. 5(a), in the case of the present invention, the analysis was conducted on the assumption that a cylindrical cooling tube, which is a Cu induction coil, is disposed outside the metal sector, and glass and a titanium ring which provides melting heat to the glass using induction current are disposed inside the metal sector. FIG. 5(b) shows the case of the conventional metal sector in which two cooling passages are formed in the single metal sector, and illustrates the result of the analysis which was carried out under the same conditions as that of the FIG. 5(a).

[Table 1] quantitatively shows a current distribution ratio (%) by models, which results from the analysis. It was understood that the sector structure of the present invention is higher than the conventional technique in a ratio of induction current applied to glass.

TABLE 1

|  | Induction current distribution ratio (%) | | | |
| --- | --- | --- | --- | --- |
|  | Pipe | Metal sector | Glass | T-ring |
| Present invention | 47.2 | 44.8 | 3.5 | 4.5 |
| Conventional technique | 0 | 86.1 | 2.8 | 11.1 |

Therefore, the cold crucible induction melter according to the present invention can increase the operational efficiency compared to the conventional sector structure.

Although the preferred embodiments of the present invention have been disclosed for illustrative purposes, the present invention is not limited to the embodiments or drawings.

What is claimed is:

1. A cold crucible induction melter, comprising:
a plurality of metal sectors forming a wall of the cold crucible induction melter, each of the metal sectors including
an inner curved portion forming an inner side surface of the metal sector, the inner curved portion being convex inward relative to the wall and having a semicircular shape as a whole to prevent an electric arc from being generated,
an outer planar portion forming an outer side surface of the metal sector and having a planar shape,
two side planar portions forming side surfaces of the metal sector, connecting the inner curved portion to the outer planar portion and having a planar shape,
a top planar portion forming a top end surface,
a bottom planar portion forming a bottom end surface,
a cooling passage longitudinally formed in inside the metal sector such that an inner periphery of the metal sector forms the cooling passage, the cooling passage extending from a bottom end surface to a top end surface of the metal sector such that both ends of the cooling passage are open, respectively, at the bottom end surface and the top end surface of the metal sector, and
an insulation layer covering the inner curved portion and the two side planar portions; and
a connection pipe connecting the cooling passage of the metal sector to a cooling passage of an adjacent metal sector on the top end surface of the metal sector, wherein a coolant flows in one direction from a bottom end to a top end of the metal sector and a top end to a bottom end of the adjacent metal sector.

2. A cold crucible induction melter, comprising:
a plurality of metal sectors forming a wall of the cold crucible induction melter, each of the metal sectors including
an inner curved portion forming an inner side surface of the mental sector, the inner curved portion being convex inward relative to the wall and having a semicircular shape as a whole to prevent an electric arc from being generated,
an outer planar portion forming an outer side surface of the metal sector and having a planar shape,
two side planar portions forming side surfaces of the metal sector, connecting the inner curved portion to the outer planar portion and having a planar shape,
a top planar portion forming a top end surface,
a bottom planar portion forming a bottom end surface,
a cooling passage longitudinally formed inside the metal sector such that an inner periphery of the metal sector forms the cooling passage, the cooling passage extending from a bottom end surface to a top end surface of the metal sector such that both ends of the cooling passage are open, respectively, at the bottom end surface and the top end surface of the metal sector, and
an insulation layer covering the inner curved portion and the two side planar portions;
a cooling tube provided outside the wall; and
a connection pipe connecting the cooling passage of the metal sector to a cooling passage of the cooling tube on the top end surface of the metal sector, wherein a coolant flows in one direction through the cooling tube and the metal sector.

3. The cold crucible induction melter according to claim 2, wherein the number of cooling tubes Is equal to the number of metal sectors, and
wherein each of the cooling tubes is connected to the cooling passage of the corresponding single sector.

* * * * *